United States Patent [19]
Olbrich et al.

[11] 4,350,219
[45] Sep. 21, 1982

[54] BATTERY POWERED ELECTRIC MOTOR VEHICLE

[75] Inventors: Gottfried Olbrich, Sachsenheim; Peter Pfeffer, Lauffen, both of Fed. Rep. of Germany

[73] Assignee: Robert Bosch GmbH, Stuttgart, Fed. Rep. of Germany

[21] Appl. No.: 213,543

[22] Filed: Dec. 5, 1980

[30] Foreign Application Priority Data

Dec. 15, 1979 [DE] Fed. Rep. of Germany ....... 2950670

[51] Int. Cl.³ .............................................. B62D 5/04
[52] U.S. Cl. ................................. 180/65 R; 180/142; 180/79.1; 318/68; 318/113
[58] Field of Search ...................... 180/79.1, 214, 216, 180/65 R, 65 F, 142; 280/132; 318/113, 39, 49, 68, 77

[56] References Cited
U.S. PATENT DOCUMENTS 3,252,247 5/1966 Miller et al. ................... 180/79.1 X
3,692,137 9/1972 Inoue ................................. 180/142
4,287,959 9/1981 Inman ........................... 180/65 R X Primary Examiner—Joseph F. Peters, Jr.
Assistant Examiner—Michael Mar
Attorney, Agent, or Firm—Michael J. Striker

[57] ABSTRACT

The battery energized electric motor vehicle has a main driving motor connected to the battery via a footpedal operated control circuit; an auxiliary electric motor for a steering device is connected to the battery in series with the main driving motor and across the control circuit of the latter so that a difference voltage between the battery voltage and the instant driving voltage applied to the main driving motor controls the steering device.

5 Claims, 2 Drawing Figures

BATTERY POWERED ELECTRIC MOTOR VEHICLE

BACKGROUND OF THE INVENTION

This invention relates generally to electric motor vehicles, and in particular to vehicles having a driving electric motor and an auxiliary electric motor for an electric or hydraulic steering device such as used for example in fork lifters.

Known electric motor vehicles of this kind, such as for example fork lifter, or a lifting transporter having steering means on its rear axle, have the disadvantage that the steering device controlled by a servo motor is prone to oversteering which in turn frequently results in steering instability.

SUMMARY OF THE INVENTION

It is therefore a general object of the present invention to overcome the aforementioned disadvantage.

More particularly, it is an object of the invention to provide an improved electric motor vehicle of the aforedescribed type in which the steering stability is substantially increased, especially at high driving speeds.

A further object of the invention is to provide such an improved electric motor vehicle which has a simple steering stage and a simple connection of its electrical circuit.

In keeping with these objects, and with others which will become apparent hereafter, one feature of the invention resides, in an electric motor vehicle of the above described type, in the provision of a power source for the auxiliary electric motor for the steering device the voltage of which is inversely proportional to the voltage applied to the main driving motor and thus to the travelling speed of the vehicle. The main driving motor is controlled via a footpedal operated control circuit to receive a part of the battery voltage corresponding to the desired travelling speed. The difference between the momentary voltage applied to the driving motor and the full voltage of the storage battery is applied to the auxiliary motor for the steering device.

The novel features which are considered as characteristic for the invention are set forth in particular in the appended claims. The invention itself, however, both as to its construction and its method of operation, together with additional advantages and objects thereof, will best be understood from the following description of specific embodiments when read in connection with the accompanying drawing.

DESCRIPTION OF THE PREFERRED EMBODIMENTS

In pulse controlled electric motor vehicles having a steering mechanism on the rear axle, such as for example fork trucks driven by an electric motor and energized by storage batteries, the average voltage applied to the main driving motor 10 is approximately proportional to the speed of travel of the vehicle; the speed of travel is controlled by a footpedal coupled to an electrical control circuit in series with the motor 10. The hydraulic steering device includes a pump 11 driven by an auxiliary electric motor 12 which according to this invention, is energized by the voltage difference resulting between the instantaneous voltage applied to the main driving motor 10 and the full voltage of the storage battery 14. In this manner, the hydraulic pump 11 delivers a stream of pressure fluid which is inversely proportional to the travelling speed of the vehicle. In other words, the rotational speed on the steering wheel decreases with increasing speed of travel of the vehicle and consequently the vehicle cannot be oversteered. This condition is relevant to the operation with the servo motor whereas the manual steering remains unaffected.

Figure 1:
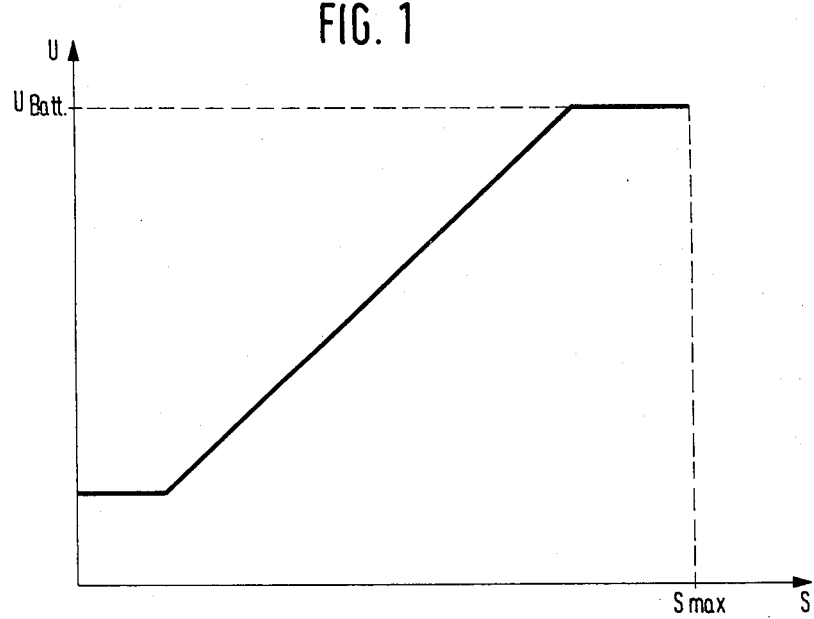
FIG. 1 is a plot diagram of the speed of the main driving motor of the vehicle versus the applied voltage.

In the plot diagram in FIG. 1, the horizontal axis x indicates the speed of the vehicle determined by the displacement of the footpedal which in turn is coupled to an electric control circuit connecting the main driving motor 10 to the storage battery 14. From the diagram it is evident that voltage across the main driving motor 10 corresponds to the region below the inclined line; the region above the plotted line and bounded by the dashed line corresponds to the difference voltage between the voltage of the battery and the momentary voltage across the main driving motor 10. This difference voltage according to this invention is applied to the auxiliary motor 12 for the pump 11 of the steering device. Accordingly, by increasing the driving speed s of the vehicle the stream of working fluid delivered by the pump 11 proportionally decreases due to the correspondingly decreasing voltage across the auxiliary motor 12.

Especially in an emergency situation during the sudden braking of the vehicle, the full steerability is immediately established due to the fact that since the operator promptly removes his foot from the footpedal and thus applies minimum voltage across the driving motor 10, the major part of the battery voltage thus is applied to the auxiliary driving motor 12 which transmits its maximum torque to the pump 11 and the steering device can operate with its maximum power.

Figure 2:
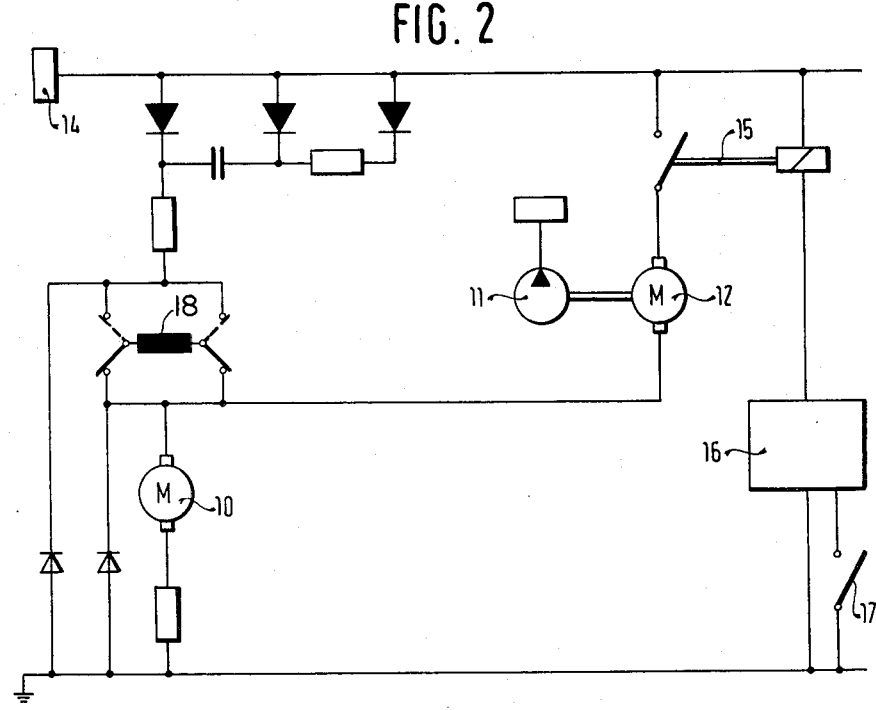
FIG. 2 is a circuit diagram of the main and auxiliary drives in the motor vehicle of this invention.

FIG. 2 illustrates the circuit diagram of an example of driving and steering circuits of an electrically driven motor vehicle. The driving electric motor 10 is connected to the poles of a storage battery 14 via a suitable control circuit operable by a footpedal 18 so that in response to depression of the footpedal an increasing voltage is applied across the terminals of the motor 10. The auxiliary electric motor 12 for the pump 11 of a hydraulic steering device is connected via a solenoid controlled safety switch 15 in series with driving motor 10 and parallel to the control circuit for the latter, to the plus pole of the battery 14. In this manner, the auxiliary motor 12 is energized by the difference voltage between the voltage across the motor 10 and the nominal voltage of the storage battery 14. The safety switch 15 is controlled by a delay action relay 16 which in turn is controlled by a switch 17 associated with the controlling footpedal. In a modification, the safety switch 15 and the delay action relay 16 can be controlled also electronically. The control circuit for the main driving motor 10 is of any suitable design known from the prior art and including diodes, thyristors, capacitors, resistors and coils as indicated in FIG. 2.

It will be understood that each of the elements described above, or two or more together, may also find a useful application in other types of constructions differing from the types described above. For example, the device of this invention can also be employed for electrical steering devices in which the auxiliary electric motor 12 drives via mechanical transmission members the steering device.

While the invention has been illustrated and described as embodied in a steering device for use in electric motor vehicles, it is not intended to be limited to the details shown, since various modifications and structural changes can be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A storage battery powered, electric motor vehicle, particularly an electric fork lifter, having a main electric drive motor connected to the storage battery in series with an electrical control circuit, comprising a steering device having an auxiliary electric motor connected to the battery in series with said main drive motor and parallel to said control circuit to be energized by the voltage drop across said control circuit, wherein the sun of the instantaneous voltage applied to the drive motor and the voltage drop across said control circuit is equal to the voltage from the storage battery.

2. A motor driven vehicle as defined in claim 1, wherein said auxiliary electric motor drives a pump of a hydraulic steering device.

3. A motor vehicle as defined in claim 1, wherein said main driving motor is driven by electrical pulses.

4. A motor vehicle as defined in claim 3, wherein said auxiliary electric motor is directly connected between one pole of the storage battery and the armature of the driving electric motor.

5. A motor vehicle as defined in claim 1, wherein said auxiliary electric motor is connected to one pole of the storage battery via a solenoid controlled safety switch, the solenoid of said safety switch being controlled by a delay action relay which is actuated by a footpedal for the main driving motor.

* * * * *